US012511921B2

(12) United States Patent
Bruenggel et al.

(10) Patent No.: US 12,511,921 B2
(45) Date of Patent: Dec. 30, 2025

(54) CLINICAL SUPPORT SYSTEM AND ASSOCIATED COMPUTER-IMPLEMENTED METHODS

(71) Applicant: Roche Diagnostics Operations, Inc., Indianapolis, IN (US)

(72) Inventors: Nils Bruenggel, Boniswil (CH); Patrick Conway, Roslindale, MA (US); Jan-Gerrit Hoogendijk, Steffisburg (CH); Pascal Vallotton, Buchs (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 84 days.

(21) Appl. No.: 18/485,600

(22) Filed: Oct. 12, 2023

(65) Prior Publication Data
US 2024/0135736 A1 Apr. 25, 2024

(30) Foreign Application Priority Data

Oct. 18, 2022 (EP) ..................................... 22202322

(51) Int. Cl.
G06V 20/69 (2022.01)
G06T 7/00 (2017.01)
(Continued)

(52) U.S. Cl.
CPC .......... *G06V 20/698* (2022.01); *G06T 7/0012* (2013.01); *G06T 11/206* (2013.01);
(Continued)

(58) Field of Classification Search
CPC ........ G16B 15/00; G16B 40/20; G06V 10/82; G06V 10/774; G06V 20/698;
(Continued)

(56) References Cited

U.S. PATENT DOCUMENTS 10,282,589 B2 * 5/2019 Mesmakhosroshahi ..................... G06V 10/82
10,354,122 B1 * 7/2019 He ......................... G06F 18/241
(Continued)

FOREIGN PATENT DOCUMENTS

KR 20210131551 A 11/2021
WO 2014164757 A1 10/2014

OTHER PUBLICATIONS

Smith, Leslie N., A disciplined approach to neural network hyperparameters: Part 1—Learning rate, batch size, momentum, and weight decay, US Naval Research Laboratory Technical Report, Apr. 24, 2018, 21 pages, available at https://arxiv.org/abs/1803.09820.

(Continued)

*Primary Examiner* — Vinh T Lam
(74) *Attorney, Agent, or Firm* — Taft Stettinius & Hollister LLP

(57) ABSTRACT

A clinical support system comprises a processor and a display component, wherein: the processor is configured to: receive image data, the image data representing an image of a plurality of cells obtained from a human or animal subject, the image data comprising a plurality of subsets of image data, each subset comprising data representing a portion of the image data corresponding to a respective cell of the plurality of cells; apply a trained deep learning neural network model to each subset of the image data, the deep learning neural network model comprising: a plurality of convolutional neural network layers each comprising a plurality of nodes; and a bottleneck layer comprising no more than ten nodes, wherein the processor is configured to apply the trained deep learning neural network model to each subset of the image data by applying the plurality of CNN layers, and subsequently applying the bottleneck layer, each node of the bottleneck layer of the machine-learning (Continued)

model configured to output a respective activation value for that subset of the image data; for each subset of the image data, derive a dataset comprising no more than three values, the values derived from the activation values of the nodes in the bottleneck layer; and generate instructions, which when executed by the display component of a clinical support system, cause the display component of the computer to display a plot in no more than three dimensions of the respective dataset of each subset of the image data. Associated computer-implemented methods, including for training the deep learning neural network model, are provided.

14 Claims, 6 Drawing Sheets

(51) Int. Cl.
| | | |
|---|---|---|
| *G06T 11/20* | (2006.01) | |
| *G06V 10/774* | (2022.01) | |
| *G06V 10/82* | (2022.01) | |
| *G16B 15/00* | (2019.01) | |
| *G16B 40/20* | (2019.01) | |

(52) U.S. Cl.
CPC ............ *G06V 10/774* (2022.01); *G06V 10/82* (2022.01); *G16B 15/00* (2019.02); *G16B 40/20* (2019.02); *G06T 2207/20081* (2013.01); *G06T 2207/20084* (2013.01); *G06T 2207/30024* (2013.01); *G06T 2210/41* (2013.01); *G06V 2201/03* (2022.01)

(58) Field of Classification Search
CPC . G06V 2201/03; G06T 11/206; G06T 7/0012; G06T 2207/30024; G06T 2207/20081; G06T 2207/20084; G06T 2210/41
See application file for complete search history.

(56) References Cited

U.S. PATENT DOCUMENTS

| | | | | |
|---|---|---|---|---|
| 10,943,157 | B2* | 3/2021 | Kuo | G06V 10/82 |
| 11,288,801 | B2* | 3/2022 | He | G06T 7/0014 |
| 11,550,011 | B2* | 1/2023 | Zhang | G06N 3/045 |
| 11,550,871 | B1* | 1/2023 | Vanhoucke | G06F 40/284 |
| 11,756,667 | B2* | 9/2023 | Lou | G16H 50/70 |
| | | | | 600/408 |
| 11,901,077 | B2* | 2/2024 | Klaiman | G06V 20/698 |
| 11,948,687 | B2* | 4/2024 | Jaber | G06N 3/0464 |
| 12,032,658 | B2* | 7/2024 | Kiraly | G06T 7/73 |
| 12,078,597 | B2* | 9/2024 | Liu | G06N 3/04 |
| 12,097,050 | B2* | 9/2024 | Baek | A61B 5/7264 |
| 12,182,970 | B2* | 12/2024 | Hu | G06N 3/0464 |
| 12,272,161 | B2* | 4/2025 | Kappel | G06V 10/82 |
| 2020/0075169 | A1* | 3/2020 | Lau | G06N 3/02 |
| 2023/0237660 | A1* | 7/2023 | Shafiee | G06N 3/045 |
| | | | | 382/134 |
| 2024/0264084 | A1* | 8/2024 | Broderick | G06V 10/82 |
| 2024/0386260 | A1* | 11/2024 | Akin | G06N 3/063 |

OTHER PUBLICATIONS

Harshanand et al.; Comprehensive Analysis of Deep Learning Methodology in Classification of Leukocytes and Enhancement Using Swish Activation Units; Mobile Networks and Applications; 2020; pp. 2302-2320; vol. 25; https://doi.org/10.1007/s11036-020-01614-3.

Shah et al.; Automated Diagnosis of Leukemia; A Comprehensive Review; IEEE Access; 2021; pp. 132097-132124; vol. 9.

Boldu et al.; A deep learning model (ALNet) for the diagnosis of acute leukaemia lineage using peripheral blood cell images; Computer Methods and Programs in Biomedicine; 2021; pp. 13; vol. 202.

* cited by examiner

CLINICAL SUPPORT SYSTEM AND ASSOCIATED COMPUTER-IMPLEMENTED METHODS

CROSS-REFERENCE TO RELATED APPLICATIONS

This application claims priority to European Patent Application No. 22202322.8 filed on Oct. 18, 2022, the contents of which are incorporated herein by reference in their entireties.

TECHNICAL FIELD OF THE INVENTION

The present invention relates to a clinical support system, computer-implemented method for identifying cell types in an image containing a plurality of cells, and a computer-implemented method for training a deep learning neural network model. Other aspects of the invention are also envisaged.

BACKGROUND TO THE INVENTION

Digital haematology is a field in which it is often necessary to be able to detect the presence of unusual cells in e.g. a slide image. Morphologically, unusual cells may differ from normal cells only in very subtle ways which require close inspection by an experienced clinician to identify. Recently, automatic identification of cells has been made easier due to the advent of sophisticated artificial intelligence-based techniques such as machine-learning. Such techniques are able to parameterize and "learn" hidden morphological or geometric features which do not necessarily correspond to easily visualizable features.

It is useful for clinicians to have an overall view of the kinds of cells which are present, as well as easily digestible information about the types of cells. For example, it may be useful for a clinician to understand some basic information about unusual cells which are present, even if those cells cannot be classified using the model (e.g. because they are rare cell types for which there is insufficient training data). At present, classifiers are constructed such that their outputs are in the form of a class, which in the case of unusual cells for which there is no training data, does not provide the clinician with any information from which they are able to make a diagnosis, or other relevant decision.

There is therefore a need to adapt and refine the outputs of machine-learning models used for automatic cell identification in a manner which optimizes them for human use, i.e. to enable meaningful information to be gleaned in a way which has not previously been possible. Such data provides ergonomic improvements for a clinician.

SUMMARY OF THE INVENTION

Broadly speaking the present invention provides a computer-implemented method which achieves these ergonomic improvements by extracting data from a bottleneck layer of a deep learning neural network model and presenting the extracted data in no more than three dimensions. The introduction of a bottleneck layer to the deep learning neural network model forces the model to condense the essential aspects of the data down to a small handful of values. By generating an output based on these values, a clinician may be presented with an improved visualization of the data which is better adapted for human use.

More specifically, a first aspect of the present invention provides a clinical support system comprising: a processor, and a display component, wherein the processor is configured to: receive image data, the image data representing an image of a plurality of cells obtained from a human or animal subject, the image data comprising a plurality of subsets of image data, each subset comprising data representing a portion of the image data corresponding to a respective cell of the plurality of cells; apply a trained deep learning neural network model to each subset of the image data, the deep learning neural network model comprising: a plurality of convolutional neural network layers each comprising a plurality of nodes; and a bottleneck layer comprising no more than ten nodes, wherein the processor is configured to apply the trained deep learning neural network model to each subset of the image data by applying the plurality of CNN layers, and subsequently applying the bottleneck layer, each node of the bottleneck layer of the machine-learning model configured to output a respective activation value for that subset of the image data; for each subset of the image data, derive a dataset comprising no more than three values, the values derived from the activation values of the nodes in the bottleneck layer; and generate instructions, which when executed by the display component of a clinical support system, cause the display component of the computer to display a plot in no more than three dimensions of the respective dataset of each subset of the image data. The clinical support system may be in the form of, e.g. a digital haematology analyser. The clinical support system may also be in the form of a laboratory information system or a hospital information system, or more specifically a module (e.g.

a physical hardware module, or a software module implemented in code) of a laboratory information system or a hospital information system.

The term "activation value" is used to represent a scalar output of a node in a neural network. It may be in the form of a positive or negative number. As a general rule, the activation value of each of the nodes in the bottleneck layer is a parameterization of the extent to which the cell in question displays a certain feature (such as a morphological or geometrical feature). The features are usually hidden or latent features which do not necessarily correspond to easily-identifiable features in real life. The provision of the bottleneck layer effectively forces the deep learning neural network model to generate no more than ten hidden features, and to parameterize the morphology of the cell in terms of those features only. Similar cell types are likely to have similar, or approximately similar activation values in the bottleneck layer. This means that when the dataset is derived and displayed, populations of cells of the same or similar types would generally be clustered in the displayed plot. A clinician would, in general, know which locations in the plot correspond to which cell types. This means that clusters of unusual cells, which are not located in the expected locations in the plot could readily be identified as an unusual cell population within the sample. Furthermore, the location of the cluster within the plot would also provide the clinician with useful information. For example, if a cluster is located between two expected clusters, this may indicate to a clinician that the unknown population contains cells which having morphological properties which lie between the properties of the cells represented by the two expected clusters.

Thus, it will be appreciated that by introducing a bottleneck later into the deep learning neural network model, and plotting a dataset derived from a plurality, and preferably all of the activation values within that dataset, it is possible to generate an output which is easily interpretable, and therefore easily usable by a clinician. Specifically, in contrast to the traditional outputs of a classifier, outputs generated by the clinical support system of the first aspect of the invention provide a clinician with more information, which better allows them to make a clinical decision, in terms of both enabling populations of unusual cells to be easily identifiable, and by placing them in locations indicative of some of their morphological properties, as compared to other cells. Such a clinical support system is therefore ergonomically improved relative to a clinical support system employing a simple classifier alone.

In preferred cases, the deep learning neural network model is a classifier model. The inventors have shown that the performance of a classifier model with no more than ten nodes is still sufficient to identify cell types or components of blood, of interest, e.g. neutrophils, basophils, lymphocytes, band neutrophils, blasts, debris, eosinophils, immature granulocytes, lymphocytes, monocytes, platelets, atypical lymphocytes, promyelocytes, myelocytes, metamyelocytes, and plasma cells. Thus, the machine-learning model may further be configured to generate a classification output based on the activation values of the nodes in the bottleneck layer, the classification output indicative of the type of cell in the image corresponding to the subset of image data. The present invention thus enables a balance between ergonomic visualization of data about the population of cells, and effective classification, greatly aiding a clinician in the exercise of their duties. This balance is achieved particularly effectively when the number of nodes in the bottleneck layer is either five, six, seven, eight, nine, or ten.

The bottleneck layer may comprise two or three nodes. In these cases, the processor may be configured to derive a dataset comprising no more than three values from the nodes in the bottleneck layer by extracting the activation values of each of the two or three nodes in the bottleneck layer. When there are more than three nodes in the bottleneck layer (i.e. when there are four to ten nodes in the bottleneck layer), the processor may be configured to derive a dataset comprising no more than three nodes by extracting the activation values from two or three nodes in the bottleneck layer. Alternatively, when there are more than three nodes in the bottleneck layer, the processor may be configured, for each subset of the data, to derive a plurality of N datasets, each dataset comprising no more than three values, the values for a given dataset derived from the activation values of a respective subset of the nodes. Then, the processor may be configured to generate instructions, which when executed by the display component of the clinical support system, cause or enable it to display a plurality of plots, each in no more than three dimensions. Each plot of the plurality of plots preferably corresponding to datasets derived from the activation values of the same nodes of the bottleneck layer. For example, when there are N nodes in the bottleneck layer, N may be equal to "N choose 3"[1] or "N choose 2", or the sum of the two. This means that a

[1] Where "X choose Y" is the way to select a subset of Y elements from a set of X elements, and may be defined as follows:

$$\binom{X}{Y} = \frac{X!}{Y!(X-Y)!}$$

plurality of plots can be generated, each corresponding to the values of a different combination of nodes from the bottleneck layer. By outputting a plurality of plots in this manner, more useful outputs are provided to a clinician.

The term "bottleneck layer" is used to highlight the fact that the number of nodes in the bottleneck layer is less than the number of nodes in previous layers (i.e. in the convolutional neural network layers). The trained deep learning neural network may be a residual network, such as a ResNet18, ResNet34, ResNet50, or ResNet101.

We have discussed already that the main purpose of the present invention is the provision of a clinical support system which is better able to provide a user with an ergonomic output to enable clinical decisions and assessments to be made. However, once an output is generated, the processor may be configured to identify, based on clusters of points in the plots or the plurality of datasets, one or more cell types present in the image of a plurality of cells. For example, the processor may be configured to apply a clustering algorithm to the plurality of points in the plots, or the plurality of datasets in order to identify clusters of cells, and to classify the cells in each cluster. In some cases, unusual cells may not appear in expected clusters. In those cases, the processor may be configured to detect the presence of abnormal cells in the image of a plurality of cells based on points which do not fall within clusters associated with normal cells.

There are various other steps which may be executed by the processor after the generation and display of the plot or plots. The processor may comprise an analysis module configured to execute various analytical functions based on the generated plots. Some examples are given below, but it will be appreciated that generating and plotting the outputs of the deep learning neural network model as outlined here enables a more straightforward extraction of meaningful data, in addition to a more ergonomic display of that data. The analysis module may be configured to execute quantitative analysis on the plots, or the datasets giving rise to the plots. For example, the analysis module may be configured to execute or apply a clustering algorithm to the plurality of points in the plots, or the plurality of datasets to identify clusters of cells.

The analysis module may be further configured to execute analysis on the clusters of the cells. For example, the analysis module may be configured to determine the number of points in each of one or more of the clusters. Or, the analysis module may be configured to determine the proportion of the points which fall within each cluster. This may be used to identify conditions leading to an elevated number or proportion of cells relative to a normal state, such as neutrophilia, polycythaemia, or leucocytosis.

By tracking the movement of the clusters over time, diagnostic analysis may be performed, i.e. tracking the status or progression of a disease. Accordingly, the processor may be configured to execute all of the steps required to generate the plots a plurality of times, and the analysis module may be configured to track the shift in the clusters to generate shift data. The analysis module may be configured to determine a clinically meaningful output based on the shift data. The clinically meaningful output may comprise a score or other data indicative of the shift data, which may allow a clinician to make a relevant decision (e.g. a diagnosis). In some cases, the processor may be configured to generate instructions which when executed by a display component, cause the display component to display the plurality of plots in a time-ordered sequence, each plot forming a frame of a video or animation. In this way, a clinician is able to visualize more clearly the shift in the clusters, providing them with a more ergonomic view, enabling them to make appropriate clinical decisions, e.g. to determine the progress of a disease, or to discern whether a therapy is working.

The analysis module may be configured to overlay the plot with one or more reference clusters (e.g. reflecting the 99th percentile of each respective normal cell type). Herein, "reference cluster" is used to refer to a region of space in the two- or three-dimensional plot which reflects a normal population of a given type of cell. This may be obtained by e.g. running the deep learning neural network model on a known normal population of cells, or on images known to be of cells characteristic of that type of cell. By overlaying one or more reference clusters in this manner, a clinician is more able to detect deviations, thus improving the ergonomics of the output.

The processor, e.g. the analysis module thereof, may be configured to augment the dataset pertaining to a given cell with additional data which has been generated in respect of that cell using different analytical methods. For example, the processor (e.g. the analysis module thereof) may be configured to augment the dataset with segmentation data, or CD[2] marker analysis data. The data may include e.g. nucleus-to-cytoplasm ratio.

We now consider ways in which a clinician or other user can advantageously interact with the generated plot, in a manner which enhances the ergonomics of the interface, and the manner in which a clinician is able to obtain and process data. In the computer-implemented method, the processor may be configured to generate instructions, which when executed by the display component of the clinical support system, cause it to display the plot (or plurality or plots, or animation/video as described previously) in a graphical user interface. The graphical user interface may be configured to receive user input, e.g. in the form of a mouse-click, screen touch, or any other conventional input. The user input may comprise selection of one or more data points in the displayed plot.

[2] Cluster of differentiation, a well-known term in the art.

In response to the selection of one or more data points, the processor may be configured to generate instructions which when executed by the display component, cause it to display supplementary information relating to the one or more data points. For example, the supplementary information may comprise an image of the cell which is represented by the data point. In order to do so, the processor may be configured to retrieve the subset of image data corresponding to the data point in question, and to generate instructions which when executed by the display component, cause it to render an image based on the subset of image data, and to display the rendered image.

In some cases, the images of each cell in the population may be displayed in a gallery adjacent to the plot. Then, when one or more cells are selected, as outlined above, the processor may be configured to sort the images such that the images corresponding to the selected data points are displayed first, or in a more prominent location in the gallery view. In this way, a clinician (or other user) is able quickly to retrieve images of cells represented by the data points which they have identified may be abnormal, e.g. because they are not located with a cluster representing normal cells. This allows the clinician quickly to retrieve the data pertaining to the cells of interest, on the basis of which they may be able to make a diagnosis or glean other clinically relevant information.

In those cases in which the images of cells are displayed alongside the plot, the user input may comprise selection of an image. In response to the selection, the data point corresponding to that cell may be highlighted in the plot.

The supplementary information may further comprise other information about the cell, such as segmentation data, results of CD marker analysis, or nucleus-to-cytoplasm ratio, as mentioned previously. This enables a clinician to access additional information about a data point quickly and straightforwardly, thus improving the ergonomics of the system to a greater extent.

The first aspect of the invention relates to a clinical support system. The second aspect of the invention relates to a corresponding computer-implemented method (which may be executed by the processor of the clinical support system of the first aspect of the invention). More specifically, a second aspect of the invention provides a computer-implemented method of identifying cell types within an image of a plurality of cells, the computer-implemented method comprising: receiving image data, the image data representing an image of a plurality of cells obtained from a human or animal subject, the image data comprising a plurality of subsets of image data, each subset comprising data representing a portion of the image data corresponding to a respective cell of the plurality of cells; applying a trained deep learning neural network model to each subset of the image data, the deep learning neural network model comprising: a plurality of convolutional neural network layers each comprising a plurality of nodes; and a bottleneck layer comprising no more than ten nodes, wherein applying the trained deep learning neural network model to each subset of the image data comprises applying the plurality of CNN layers, and subsequently applying the bottleneck layer, each node of the bottleneck layer of the machine-learning model configured to output a respective activation value for that subset of the image data; for each subset of the image data, deriving a dataset comprising no more than three values from the nodes in the bottleneck layer; and generating instructions, which when executed by the display component of a clinical support system, cause the display component of the computer to display a plot in no more than three dimensions of the respective dataset of each subset of the image data. It will be appreciated that the optional features set out above in respect of the first aspect of the invention apply equally well to the second aspect of the invention. Specifically, the optional features relating to the operations executed by the processor of the clinical support system of the first aspect of the invention (or which the processor is configured to execute) may also apply to the second aspect of the invention.

Both the first and second aspects of the invention rely on a trained deep learning neural network model which is applied to various subsets of image data. It will be understood that a deep learning neural network model is a machine-learning model which must be trained before it can be used. A third aspect of the invention provides a computer-implemented method of generating a deep learning neural network model which can be used in implementations of the first and second aspects of the invention. Specifically, a third aspect of the invention provides a computer-implemented method of generating a trained deep learning neural network model for identification of cells types within an image of a plurality of cells, the computer-implemented method comprising: receiving training data comprising a plurality of sets of electronic data, each set of electronic data representing a respective image of a cell, each set of electronic data further comprising a label indicative of the type of the cell depicted in the image; in a first training phase, training, using the training data, a deep learning neural network model comprising an encoder portion comprising a plurality of convolutional layers and an initial head portion configured to output a cell type, to classify images of cells and to output a cell type, thereby generating an intermediate deep learning neural network model; replacing the initial head portion with a substitute head portion comprising a bottleneck layer comprising no more than ten nodes, to generate an updated intermediate deep learning neural network model. The third aspect of the invention may further comprise a second training phase of training the updated intermediate deep learning neural network model using the training data, to generate the trained deep learning neural network model.

Herein, the "encoder" portion of the deep learning neural network model is the portion, or sub-network of the deep learning neural network model which is configured to learn a representation of the input data in terms of the hidden variables or features.

And, the "head" portion is the portion which is configured to execute the classification operation based on the values of the hidden variables.

The training data may comprise a first subset of training data and a second subset of training data, each containing a respective plurality of sets of electronic data as defined previously. In these cases, the first training phase (on the untrained deep learning neural network model) may be executed using the first subset of training data, and the second training phase (on the updated intermediate deep learning neural network model). Alternatively, the full training data may be used to execute both the first training phase and the second training phase.

As discussed above, the deep learning neural network model may comprise a plurality of convolutional layers. As such, the deep learning neural network model may be a convolutional neural network. The computer-implemented method of the third aspect of the invention (or any aspect, for that matter) is applicable to all kinds of deep learning neural network models and in particular convolutional neural networks of any architecture.

Examples of convolutional neural network architectures which can be employed in implementations of the present invention include residual neural networks (Resnets, e.g. Resnet34), ResNeXt neural networks, AlexNet neural networks, VGG neural networks, vision transformer neural networks, and squeeze-and-excitation neural networks. This is by no means an exhaustive list, and is intended to convey the breadth of applicability of computer-implemented methods of the third aspect of the present invention. Preferably, the deep learning neural network model is a classifier model. The classifier model may be configured to classify cells or other structures in the image as one or more of: neutrophils, band neutrophils, basophils, blasts, debris, eosinophils, immature granulocytes, lymphocytes, monocytes, platelets, atypical lymphocytes, promyelocytes, myelocytes, metamyelocytes, plasma cells. Specifically, the classifier model is preferably configured to classify the cells or other structures in the image after the first training phase. After the classification head has been removed, it is inevitable that the classification performance of the model will decline, but it has been shown that the introduction of a bottleneck layer with no more than ten nodes is still able to provide adequate classification accuracy as well as the ergonomically-improved visualization of the output. In some cases, the bottleneck layer may have two or three nodes.

The bottleneck layer may be configured to output a dataset comprising no more than three values. In cases, when the bottleneck layer comprises two nodes or three nodes, the bottleneck may be configured to output the activation values of each of the nodes. If there are more than three nodes, the bottleneck layer may be configured to select a subset of two or three nodes, and to output the activation values of those nodes. See the "summary" section for other examples of how this may be achieved.

In some cases, the initial head portion may comprise one or more dense layers. In the present context, a "dense layer" is one in which each node in the layer is configured to, or is able to, receive an input from every node in the previous layer. In these cases, replacing the initial head portion with the substitute head portion may comprise removing the or more dense layers, and adding an identity layer for each removed dense layer. In the present context, an "identity layer" is a layer in which the output of a node is identical to the input of that node, i.e. one which does not make any changes to the input. The use of identity layers, rather than e.g. simply removing the one or more dense layers ensures that the representation space is not squeezed in undesirable ways.

Training the updated intermediate deep learning neural network model may comprise freezing the encoder portion of the deep learning neural network model; and training the updated intermediate deep learning neural network model by allowing only the parameters of the substitute head portion to vary. In other words, the representation learned by the encoder portion remains, it is only the final part of the network in which the weights of the nodes are allowed to vary. At this point, the classification performance of the network may improve, if only marginally. In these cases, the updated intermediate deep learning neural network model may be trained using a one cycle policy[3]. During training of a machine-learning model, it is important to select an appropriate learning rate (which dictates how much gradient to be back-propagated). A small learning rate means that the model converges slowly, but a large learning rate can cause the model to diverge. Conventionally, learning rate is decreased as the model approaches convergence. However, when a one cycle policy is used, the learning rate is increased for a first period, and the learning rate is decreased for a second period preferably having the same length as the first period. Doing so prevents overfitting, avoid steep areas of loss, and assists the model to reach flatter minima.

Training the updated intermediate deep learning neural network model may further comprise unfreezing the encoder portion of the updated intermediate deep learning neural network model (i.e. allowing its values to continue to vary), and training the entire updated intermediate deep learning neural network model using the training data. The training data may comprise a third subset of training data which is used for this final training step. Once again, the classification performance may improve, if only marginally.

A fourth aspect of the invention provides a clinical support system according to the first aspect of the invention, wherein the deep learning neural network model is generated using the computer-implemented method of the third aspect of the invention. A fifth aspect of the invention provides a computer-implemented

[3] https://arxiv.org/abs/1803.09820 method according to the second aspect of the invention, wherein the deep learning neural network model is generated using the third aspect of the invention. It will be readily appreciated that optional features set out in respect of the third aspect of the invention apply equally well to the fourth and fifth aspects of the invention.

Additional aspects of the invention provide a computer program comprising instructions which, when the program is executed by a computer, cause the computer to carry out the computer-implemented method of the second, third or fifth aspect of the invention. Another aspect of the invention provides a computer-readable storage medium having stored thereon the computer program of the previous aspect of the invention.

The invention includes the combination of the aspects and preferred features described except where such a combination is clearly impermissible or expressly avoided.

BRIEF DESCRIPTION OF THE DRAWINGS

Embodiments of the present invention will now be described with reference to the accompanying drawings, in which.

DETAILED DESCRIPTION OF THE DRAWINGS

Aspects and embodiments of the present invention will now be discussed with reference to the accompanying figures. Further aspects and embodiments will be apparent to those skilled in the art. All documents mentioned in this text are incorporated herein by reference.

Figure 1:
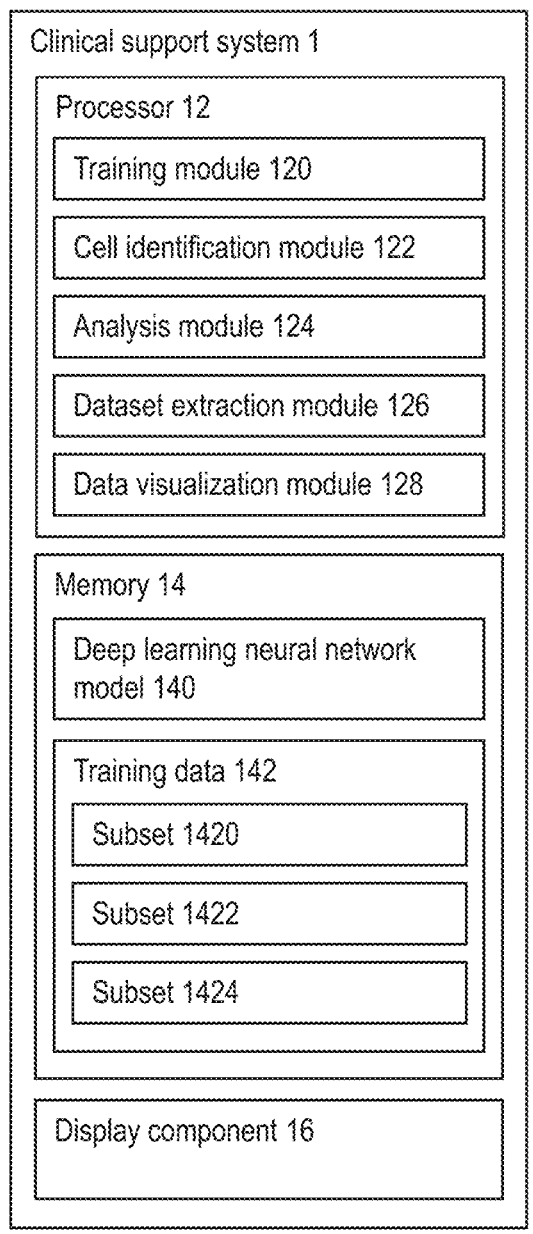
FIG. 1 is an example of a clinical support system, such as a digital haematology analyser.

FIG. 1 is a schematic diagram of a clinical support system 1 according to e.g. the first aspect of the present invention. The clinical support system 1 comprises a processor 12, a memory 14, and a display component 16. In FIG. 1, these components are all shown to be part of the same system, but it will be appreciated that the system may be a distributed system in which the various components are located on different pieces of hardware, optionally in different locations. In those cases, the components (e.g. the processor 12, the memory 14, and the display component 16) may be connected via a network (not shown). The network may be a wired network such as a LAN, or WAN, or a wireless network such as a Wi-Fi network, the Internet, or a cellular network. We now discuss the structure of the clinical support system 1 before discussing, with reference to FIGS. 2 and 4, the operations which it is configured to execute. The processor 12 includes a plurality of modules. Herein, the term "module" is used to refer to a functional module which is configured or adapted to execute a particular function. The modules may be implemented in hardware (i.e. they may be separate physical components within a computer), in software (i.e. they may represent separate sections of code, which when executed by processor 12, cause it to perform a particular function), or in a combination of both. Specifically, the processor 12 of FIG. 1 comprises: a training module 120, a cell identification module 122, an analysis module 124, a dataset extraction module 126, and a data visualization module 128. The functions of each of these modules is described in more detail shortly. The memory 14 may be in the form of a permanent memory or a temporary memory, or may comprise a combination of the two. The memory 14 stores a deep learning neural network model 140, and training data 124. The training data may comprise three subsets 1420, 1422, 1424. The subsets are preferably non-overlapping, i.e. they each contain different data records. The display component 16 is preferably in the form of a VPU, screen, or monitor which is configured to render data visually, to a clinician to view results.

Figure 2:
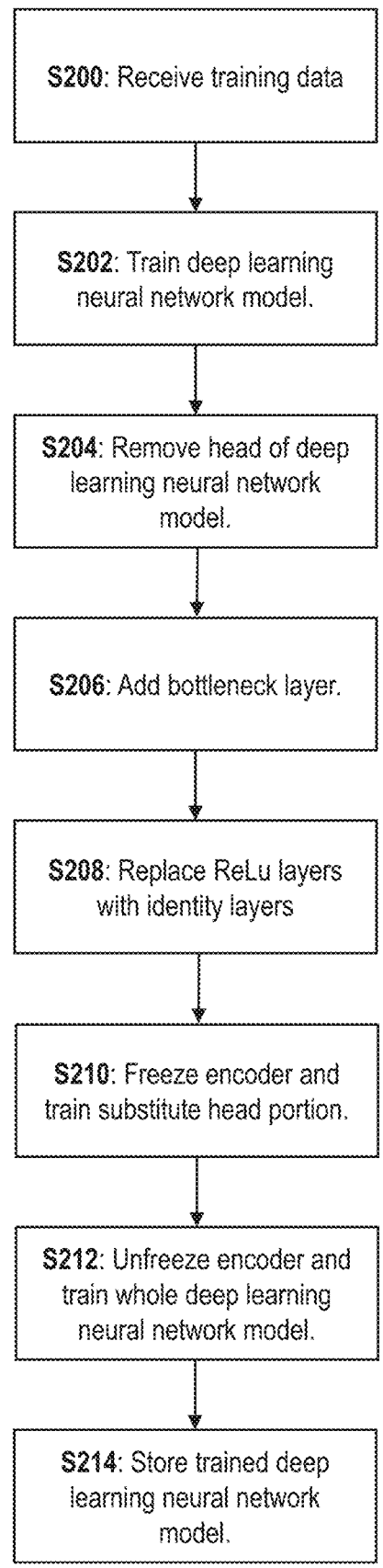
FIG. 2 is a flowchart illustrating a computer-implemented method of generating a trained deep learning neural network model.

FIG. 2 describes a process, which is performed by the training module 120 of the processor 12 of the clinical support system 1, in which a trained deep learning neural network model 140 is generated. In a first step S200, training data 142 is received, e.g. from a client device, or some repository. The purpose of the deep learning neural network model 140 is to characterize and identify cells. The training data 142 therefore comprises a plurality of sets of electronic data, each set of electronic data representing a respective image of a cell, each set of electronic data further comprising a label indicative of the type of cell depicted in the image. Training data 142 structured in this manner allows the deep learning neural network model 140 to learn to associate the image data with the cell type. It is worth mentioning that, at this juncture in the computer-implemented method, the deep learning neural network model 140 is a full deep learning neural network model, such as a classifier neural network—nothing has been removed from it yet.

In step S202, the deep learning neural network model 140 is trained using the training data 142. This is a first training phase, and may be executed using a first subset 1420 of the training data 142. During this phase, the whole deep learning neural network model 140 is trained using the first subset 1420 of the training data 142, as discussed. The first training phase, i.e. step S202, may carry on for a predetermined number of epochs, for example ten. During training of a classifier neural network 140 in this manner, the aim is generally to minimize classification loss. However, other loss functions such as reconstruction loss may be employed.

After step S202 is complete, in step S204, the classification head of the deep learning neural network model 140 is removed, to retain only the convolutional part of the deep learning neural network model 140. The convolutional part of the deep learning neural network model 140 is the part which learns a representation of the input data in terms of hidden variables, or features. The classification head is the part of the network which identifies the cell type based on the hidden representation. In step S206, a bottleneck layer containing no more than ten nodes (or neurons) is added to the end of the convolutional part of the network, to replace the classification head. The original number of output classes, and the softmax layer are retained. The bottleneck layer forces the network to condense the essential aspects of the data down to no more than ten values. In contrast to autoencoders, there is no need to be able to reconstruct the original images in a self-supervised manner. Rather, it is desirable to retain as much classification performance as possible. In step S208, selected rectified linear unit ("ReLu") layers in the classification head are replaced by identity layers, to avoid the representation space from being squeezed in undesirable ways. Then, in step S210, the encoder portion (i.e the convolutional portion) of the network is frozen.

This means that during further training phases, the weights associated with the nodes in the convolutional or encoder portion are fixed, and do not change.

A section training phase takes place in step S212. During this phase, the deep learning neural network model 140, as it now stands is trained using subset 1422 of training data 142. Improvement in performance may result from this additional training step S212. After this step is complete, in step S214, the trained deep learning neural network model 140 is stored in the memory 14.

Figure 3:
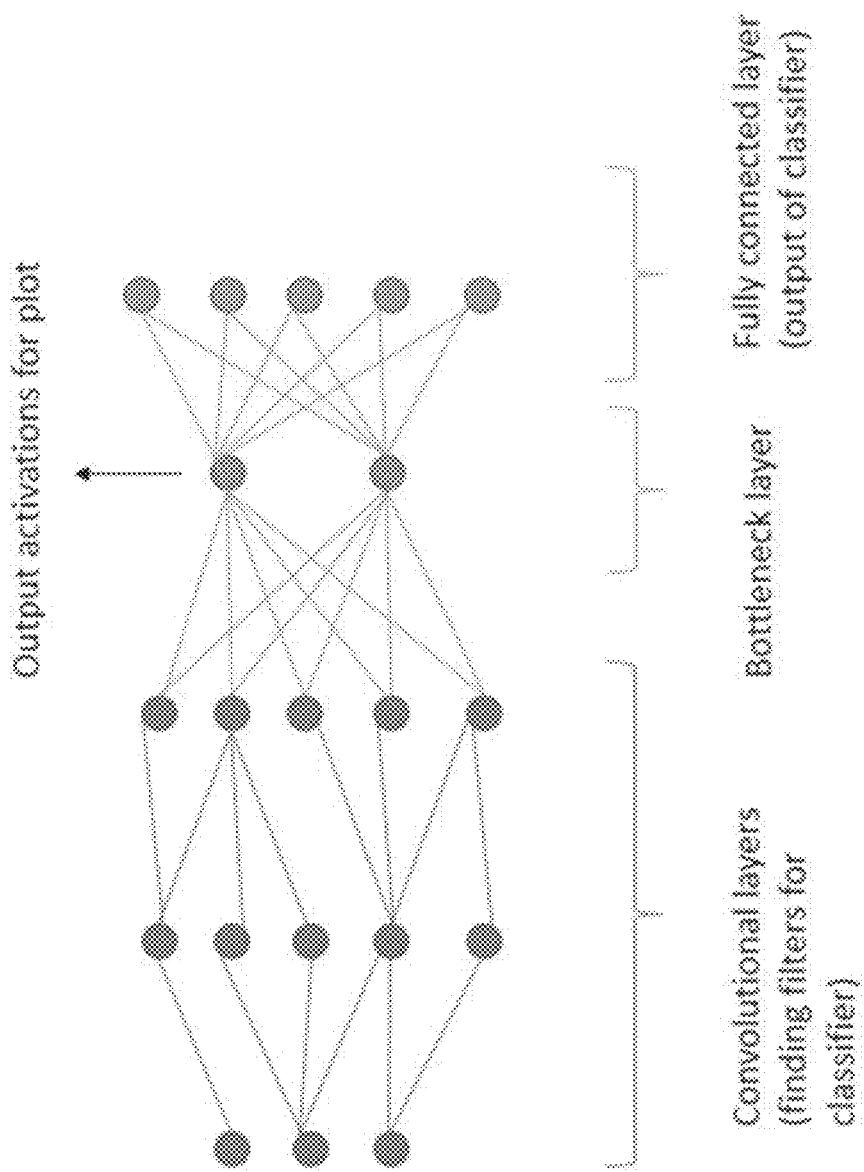
FIG. 3 is a schematic diagram of a trained deep learning neural network model.

FIG. 3 is a highly schematic diagram of a deep learning neural network model 140 which may be generated according to the present invention. The deep learning neural network model 140 includes a first plurality of convolutional layers. Then, there is a bottleneck layer, which in the example shown has two nodes only, and is configured to output the activation values of those nodes for display. Then, optionally, the deep learning neural network model 140 may further include a fully connected layer which is able to provide a classification output. This is not essential for implementations in which the only desired output is the visualization, but is advantageous when both visualization and classification are desired.

Figure 4:
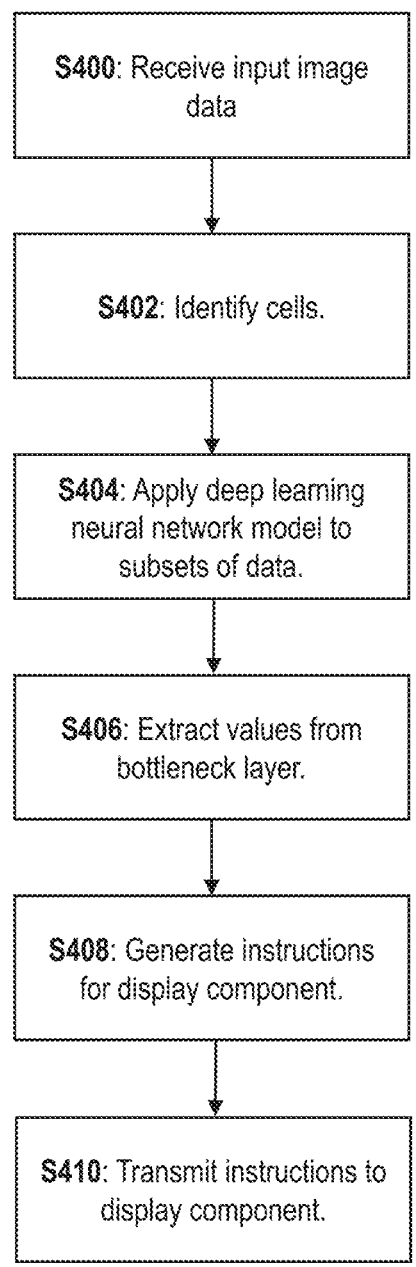
FIG. 4 is a flowchart illustrating a computer-implemented method of identifying cells using a deep learning neural network model.

FIG. 4 is a flowchart illustrating the steps of a computer-implemented method of identifying cell types within an image of a plurality of cells, which corresponds to the computer-implemented method of the first aspect of the invention. In a first step S400, input image data is received, e.g. from a client device, at the processor 12 of the clinical support system 1. The input image data may be in the form of an image of a plurality or population of cells. Accordingly, the image may contain a plurality of individual smaller images, each depicting an individual cell. Each of these smaller images is represented by a subset of the image data representing the whole image. In step S402, the cell identification module 122 is preferably configured to identify the individual cells in the image, and to identify the corresponding subsets of image data representing each of these image portions (herein, "subsets of data"). The cell identification module 122 may execute this operation using any of a number of conventional techniques for identifying individual cells within images of populations of cells, for example as set out in WO 2014/164757 A1, the entirety of which is incorporated herein by reference.

After the cells have been identified as outlined above, in step S404, the trained deep learning neural network model 140 is applied to each of the subsets of data. After the application of the convolutional layers of the deep learning neural network model 140, the bottleneck layer is reached. At this point, the properties of the cells are distilled into no more than ten scalar values, each value quantifying some hidden variable. In step S406, no more than three values are extracted from the bottleneck layer by the dataset extraction layer 126. As shown in e.g. FIG. 3, the bottleneck layer may comprise two or three nodes. In these cases, the dataset extraction module 126 may be configured to derive a dataset comprising no more than three values from the nodes in the bottleneck layer by extracting the activation values of each of the two or three nodes in the bottleneck layer. When there are more than three nodes in the bottleneck layer (i.e. when there are four to ten nodes in the bottleneck layer), the dataset extraction module 126 may be configured to derive a dataset comprising no more than three nodes by extracting the activation values from two or three nodes in the bottleneck layer.

The values extracted from the bottleneck layer in step S406 are the values which will ultimately be plotted in 2D or 3D. Accordingly, based on the values extracted from the bottleneck layer for each of the input subsets of data, the data visualization module 128 is configured to generate instructions which, when executed by the display component 16, cause the display component to display a 2D or 3D plot comprising a plurality of datapoints, each datapoint corresponding to an extracted dataset. Finally, in step S410, these instructions are output to the display component 16 for execution and display.

Figure 5:
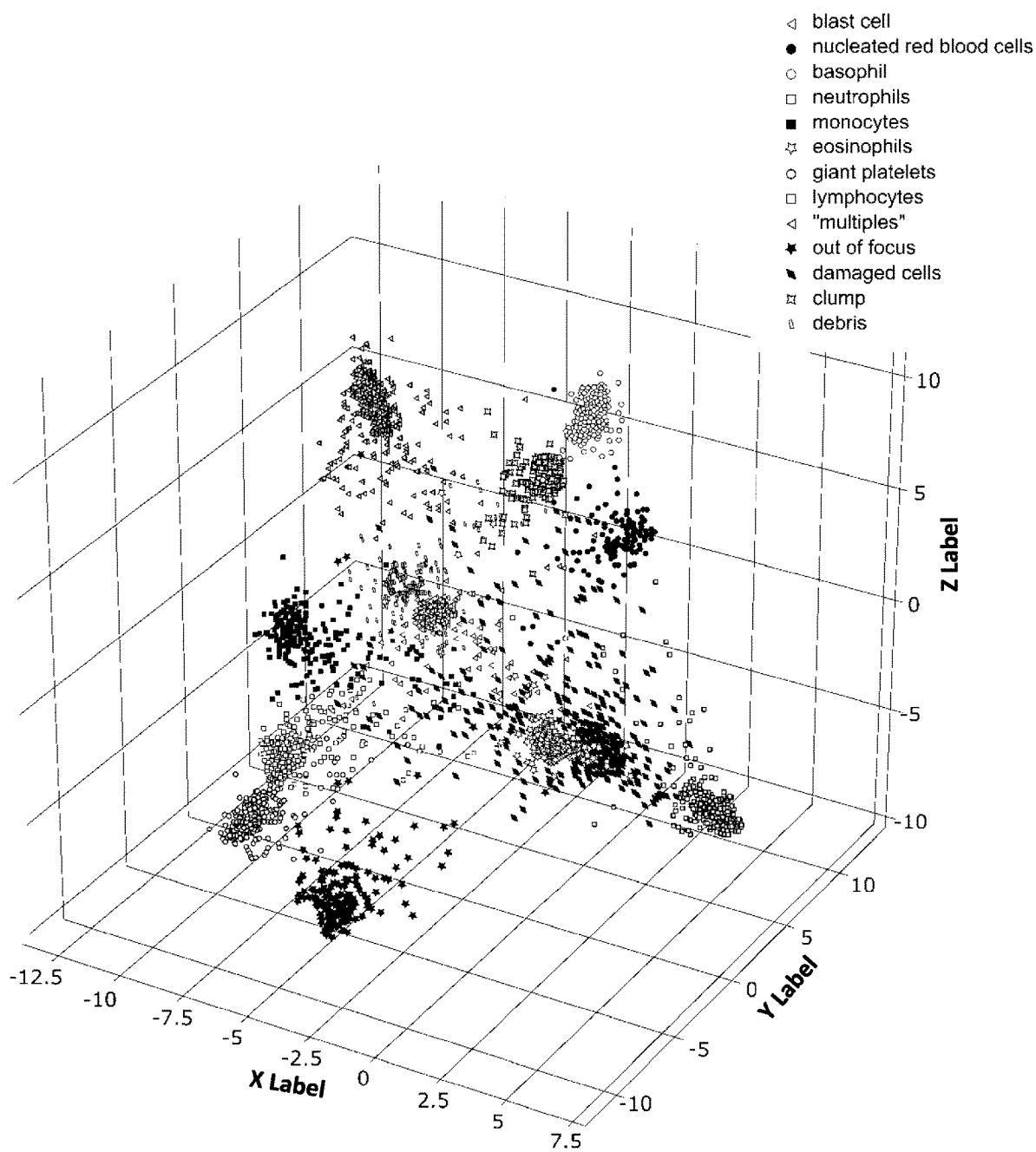
FIGS. 5 and 6 are example outputs which may be generated according to the present invention.
Figure 6:
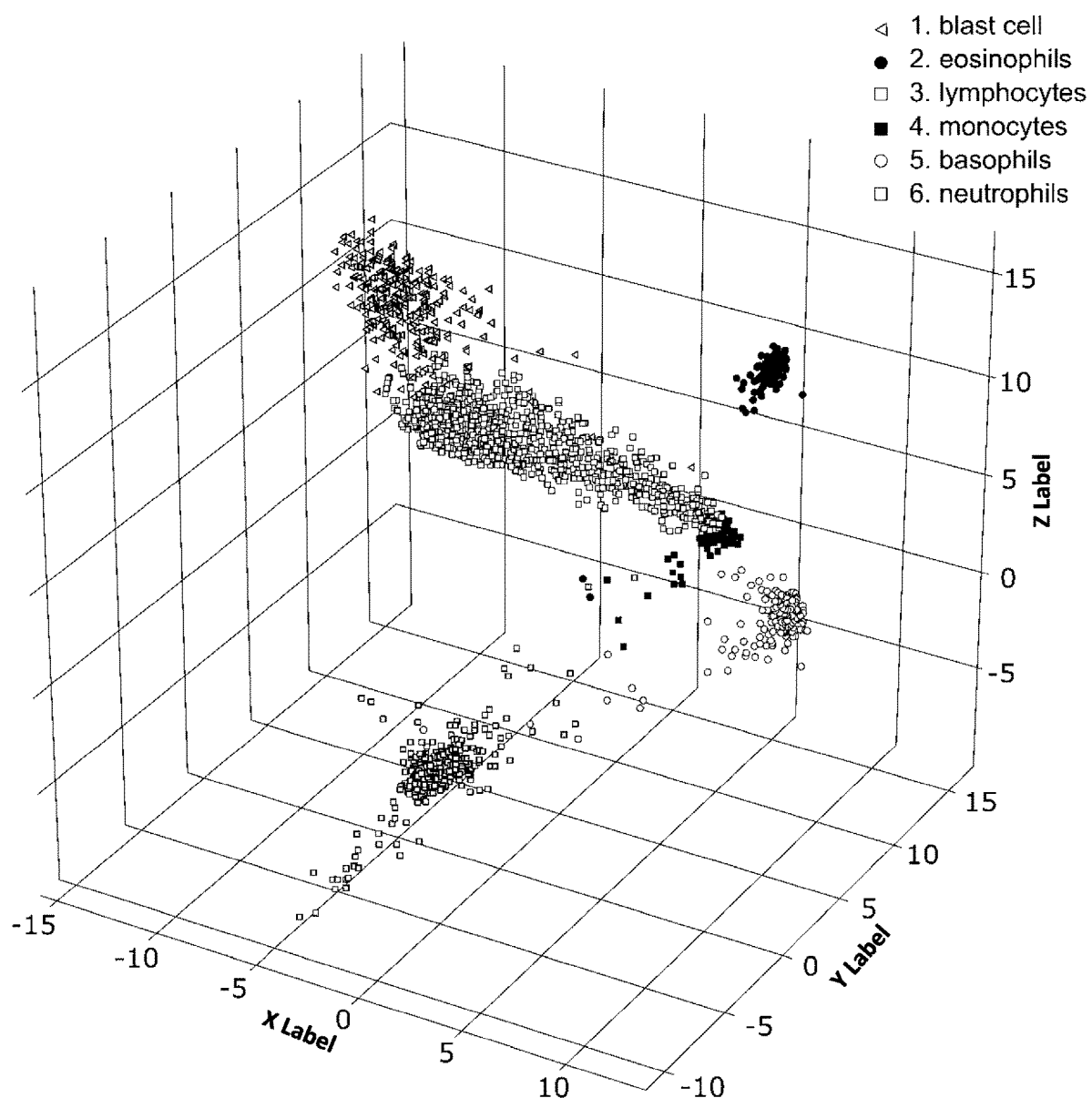

FIGS. 5 and 6 show plots which may be generated using computer-implemented methods of the present invention. FIG. 5 is a 3D plot which demonstrates that by extracting only three values from a bottleneck layer, it is possible to produce a plot in which each different type of cell (or other component of blood) is associated with a distinct, densely packed, cluster with relatively few outliers. In this case, the clusters correspond to basophils, blast cells, debris, eosinophils, lymphocytes, monocytes, neutrophils, damaged cells, clumps (refers to clumps of platelets stuck together), cells which are not in focus in the images (which are desirable to differentiate), giant platelets, "multiples" (where multiple cells are shown in a single image), and nucleated red blood cells.

FIG. 6 illustrates the usefulness of the present invention for identification of unusual or abnormal populations of cells within a sample. Six clusters of cells are clearly visible:

1. Blast cells
2. Eosinophils
3. Lymphocytes
4. Monocytes
5. Basophils
6. Neutrophils However, between clusters 3 and 4, there are a swathe of datapoints which do not fit into any cluster. It is clear to a clinician that such cells are abnormal, since they lie outside of a well-defined cluster. Furthermore, because the datapoints are extracted from a bottleneck of a classifier model, their location in the plot is able to provide some clinically relevant information, namely that the abnormal cells are morphologically somewhere between lymphocytes and monocytes. The present invention thus enables a visualization of the output of a classifier model which is more ergonomically-readable to a clinician such as a haematologist.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A clinical support system comprising a processor, and a display component, wherein:
   the processor is configured to:
      receive image data, the image data representing an image of a plurality of cells obtained from a human or animal subject, the image data comprising a plurality of subsets of image data, each subset comprising data representing a portion of the image data corresponding to a respective cell of the plurality of cells;
      apply a trained deep learning neural network model to each subset of the image data, the deep learning neural network model comprising: a plurality of convolutional neural network layers each comprising a plurality of nodes; and a bottleneck layer comprising no more than ten nodes, wherein the processor is configured to apply the trained deep learning neural network model to each subset of the image data by applying the plurality of CNN layers, and subsequently applying the bottleneck layer, each node of the bottleneck layer of the machine-learning model configured to output a respective activation value for that subset of the image data;
      for each subset of the image data, derive a dataset comprising no more than three values, the values derived from the activation values of the nodes in the bottleneck layer; and
      generate instructions, which when executed by the display component of a clinical support system, cause the display component of the computer to display a plot in no more than three dimensions of the respective dataset of each subset of the image data.

2. A clinical support system according to claim 1, wherein:
   the trained deep learning neural network model comprises at least an encoder portion of a deep learning neural network model which is configured to classify images of cells, the encoder portion comprising the plurality of CNN layers.

3. A clinical support system according to claim 2, wherein:
   the classifier model is configured to classify cells as one or more of: neutrophils, basophils, lymphocytes, band neutrophils, blasts, debris, eosinophils, immature granulocytes, lymphocytes, monocytes, platelets, atypical lymphocytes, promyelocytes, myelocytes, metamyelocytes, and plasma cells.

4. A clinical support system according to claim 1, wherein:
   the bottleneck layer comprises two nodes or three nodes.

5. A clinical support system according to claim 1, further comprising:
   identifying, based on clusters of points in the plots or the plurality of datasets, one or more cell types present in the image of a plurality of cells.

6. A clinical support system according to claim 5, further comprising:
   detecting the presence of one or more abnormal cells in the image of a plurality of cells based on points which do not fall within clusters associated with normal cells.

7. A computer-implemented method of generating a trained deep learning neural network model for identifying cell types, the computer-implemented method comprising:
   receiving training data comprising a plurality of sets of electronic data, each set of electronic data representing a respective image of a cell, each set of electronic data further comprising a label indicative of the type of the cell depicted in the image;
   training, using the training data, a deep learning neural network model comprising an encoder portion comprising a plurality of convolutional layers and an initial head portion configured to output a cell type, to classify images of cells and to output a cell type, thereby generating an intermediate deep learning neural network model; and
   replacing the initial head portion with a substitute head portion comprising a bottleneck layer comprising no more than three nodes, to generate an updated intermediate deep learning neural network model.

8. A computer-implemented method according to claim 7, wherein:
   the bottleneck layer comprises two nodes or three nodes.

9. A computer-implemented method according to claim 7, wherein:
   the deep learning neural network model is a classifier model.

10. A computer-implemented method according to claim 9, wherein:
    the classifier model is configured to classify cells as one or more of: neutrophils, basophils, lymphocytes, band neutrophils, blasts, debris, eosinophils, immature granulocytes, lymphocytes, monocytes, platelets, atypical lymphocytes, promyelocytes, myelocytes, metamyelocytes, and plasma cells.

11. A computer-implemented method according to claim 7, further comprising:
    training the updated intermediate deep learning neural network model using the training data, to generate the trained deep learning neural network model.

12. A computer-implemented method according to claim 11, wherein:
    training the updated intermediate deep learning neural network model comprises:
       freezing the encoder portion; and
       training the updated intermediate deep learning neural network model by allowing only parameters of the substitute head portion to vary.

13. A computer-implemented method according to claim 12, wherein:
    training the updated intermediate deep learning neural network model further comprises:
       unfreezing the encoder portion of the updated intermediate deep learning neural network model; and
       training the entire updated intermediate deep learning neural network model using the training data.

14. A computer-implemented method of identifying cell types within an image of a plurality of cells, the computer-implemented method comprising:
- receiving image data, the image data representing an image of a plurality of cells obtained from a human or animal subject, the image data comprising a plurality of subsets of image data, each subset comprising data representing a portion of the image data corresponding to a respective cell of the plurality of cells;
- applying a trained deep learning neural network model to each subset of the image data, the deep learning neural network model comprising: a plurality of convolutional neural network layers each comprising a plurality of nodes; and a bottleneck layer comprising no more than ten nodes, wherein applying the trained deep learning neural network model to each subset of the image data comprises:
- applying the plurality of CNN layers, and
- subsequently applying the bottleneck layer, each node of the bottleneck layer of the machine-learning model configured to output a respective activation value for that subset of the image data;
- for each subset of the image data, deriving a dataset comprising no more than three values from the nodes in the bottleneck layer; and generating instructions, which when executed by the display component of a clinical support system, cause the display component of the computer to display a plot in no more than three dimensions of the respective dataset of each subset of the image data.

* * * * *